US012603716B2

(12) United States Patent
Barbu et al.

(10) Patent No.: US 12,603,716 B2
(45) Date of Patent: Apr. 14, 2026

(54) POSITIONING ACCURACY ENHANCEMENTS

(71) Applicant: Nokia Technologies Oy, Espoo (FI)

(72) Inventors: Oana-Elena Barbu, Aalborg (DK);
Benny Vejlgaard, Aalborg (DK)

(73) Assignee: NOKIA TECHNOLOGIES OY,
Espoo (FI)

( * ) Notice: Subject to any disclaimer, the term of this
patent is extended or adjusted under 35
U.S.C. 154(b) by 318 days.

(21) Appl. No.: 18/457,694

(22) Filed: Aug. 29, 2023

(65) Prior Publication Data

US 2024/0080114 A1      Mar. 7, 2024

Related U.S. Application Data

(60) Provisional application No. 63/374,429, filed on Sep.
2, 2022.

(51) Int. Cl.
H04B 17/318       (2015.01)
H04W 64/00       (2009.01)

(52) U.S. Cl.
CPC .......... H04B 17/318 (2015.01); H04W 64/00
(2013.01)

(58) Field of Classification Search
CPC . H04B 17/318; H04B 7/15528; H04W 64/00;
G01S 5/0268; G01S 5/10; G01S 5/0036;
G01S 5/0205
USPC .............................. 455/226.2, 226.1; 324/76
See application file for complete search history.

(56) References Cited

U.S. PATENT DOCUMENTS

| | | | |
|---|---|---|---|
| 11,671,187 B2 * | 6/2023 | Upadhya | H04B 17/382 |
| | | | 455/456.1 |
| 12,021,775 B2 * | 6/2024 | Huang | H04W 24/04 |
| 2004/0073392 A1 * | 4/2004 | Immonen | G01S 5/021 |
| | | | 702/89 |
| 2017/0041750 A1 | 2/2017 | Jose et al. | |

(Continued)

FOREIGN PATENT DOCUMENTS

| | | |
|---|---|---|
| CN | 105723684 B | 3/2019 |
| TW | I530120 B | 4/2016 |

(Continued)

OTHER PUBLICATIONS

European search opinion dated Jan. 30, 2024 (Year: 2024).*

(Continued)

*Primary Examiner* — Juan A Torres
(74) *Attorney, Agent, or Firm* — Carter, DeLuca & Farrell LLP

(57) ABSTRACT

A first device includes at least one processor; and at least one memory storing instructions that, when executed by the at least one processor, cause the first device at least to perform: receiving, from a second device, first configuration information of a first set of passive radios for transmitting a plurality of first target signals in response to receiving a plurality of first reference signals from a third device; receiving, from the third device, at least one first reference signal; upon receiving the at least one first reference signal, receiving, based on the first configuration information, the plurality of first target signals from the first set of passive radios; and transmitting, to the second device, measurements related to the at least one first reference signal and the plurality of first target signals for positioning the first device.

1 Claim, 6 Drawing Sheets

(56) References Cited

U.S. PATENT DOCUMENTS

| | | | |
|---|---|---|---|
| 2019/0045468 A1* | 2/2019 | Blasco Serrano | .......................... H04W 56/0015 |
| 2020/0296680 A1 | 9/2020 | Akkarakaran et al. | |
| 2021/0400626 A1 | 12/2021 | Yerramalli et al. | |
| 2021/0410103 A1 | 12/2021 | Zhang et al. | |
| 2022/0231805 A1 | 7/2022 | Bao et al. | |
| 2025/0203565 A1* | 6/2025 | Zheng ................... H04W 24/10 | |

FOREIGN PATENT DOCUMENTS

| | | |
|---|---|---|
| WO | 2021/092813 A1 | 5/2021 |
| WO | 2022/154861 A1 | 7/2022 |

OTHER PUBLICATIONS

"3rd Generation Partnership Project; Technical Specification Group Radio Access Network; NR; Physical channels and modulation (Release 17)", 3GPP TS 38.211, V17.1.0, Mar. 2022, pp. 1-135.

"3rd Generation Partnership Project; Technical Specification Group Radio Access Network; NR; Physical layer procedures for control (Release 17)", 3GPP TS 38.213, V17.1.0, Mar. 2022, pp. 1-245.

"3rd Generation Partnership Project; Technical Specification Group Services and System Aspects; Service requirements for cyber physical control applications in vertical domains; Stage 1 (Release 18)", 3GPP TS 22.104, V18.3.0, Dec. 2021, pp. 1-101.

"Moderator's summary of Discussion [RAN94e-R18Prep-28] Passive IoT", 3GPP TSG RAN#94e, RP-212688, Agenda Item: 8A.5, Ericsson, Dec. 6-17, 2021, pp. 1-45.

"Msc-generator", Sourceforge, Retrieved on Sep. 14, 2023, Webpage available at : https://sourceforge.net/projects/msc-generator/.

"3rd Generation Partnership Project; Technical Specification Group Radio Access Network; NR; Physical layer procedures for data (Release 17)", 3GPP TS 38.214, V17.1.0, Mar. 2022, pp. 1-225.

"3rd Generation Partnership Project; Technical Specification Group Radio Access Network; LTE Positioning Protocol (LPP) (Release 17)", 3GPP TS 37.355, V17.0.0, Mar. 2022, pp. 1-340.

Martin-Escalona et al., "Passive Round-Trip-Time Positioning in Dense IEEE 802.11 Networks", Electronics, vol. 9, No. 8, Jul. 24, 2020, pp. 1-19.

Lu et al., "A robust UWB array localization scheme through passive anchor assistance", China Communications, vol. 18, No. 4, Apr. 27, 2021, pp. 1-13.

"IEEE 802.11", Wikipedia, Retrieved on Sep. 15, 2023, Webpage available at : https://en.wikipedia.org/wiki/IEEE_802.11.

"Ambient IoT positioning", 3GPP TSG-RAN #99, RP-230057, Agenda Item: 9.2.3, Nokia, Mar. 20-23, 2023, 4 pages.

"PCR for TR 38.848 "Study on Ambient IoT (Internet of Things) in RAN"—RAN#99 decisions", 3GPP TSG RAN Meeting #99, RP-230808, Agenda item: 9.2.3, Huawei, Mar. 20-23, 2023, 6 pages.

Extended European Search Report received for corresponding European Patent Application No. 23194750.8, dated Jan. 30, 2024, 13 pages.

"3rd Generation Partnership Project; Technical Specification Group Radio Access Network; Evolved Universal Terrestrial Radio Access (E-UTRA); LTE Positioning Protocol A (LPPa) (Release 17)", 3GPP TS 36.455, V17.0.0, Apr. 2022, pp. 1-88.

"3rd Generation Partnership Project; Technical Specification Group Radio Access Network; Evolved Universal Terrestrial Radio Access (E-UTRA); LTE Positioning Protocol (LPP) (Release 15)", 3GPP Ts 36.355, V15.5.0, Sep. 2019, pp. 1-224.

European Office Action for Application No. 23 194 750.8 dated Mar. 27, 2025, 8 pages total.

* cited by examiner

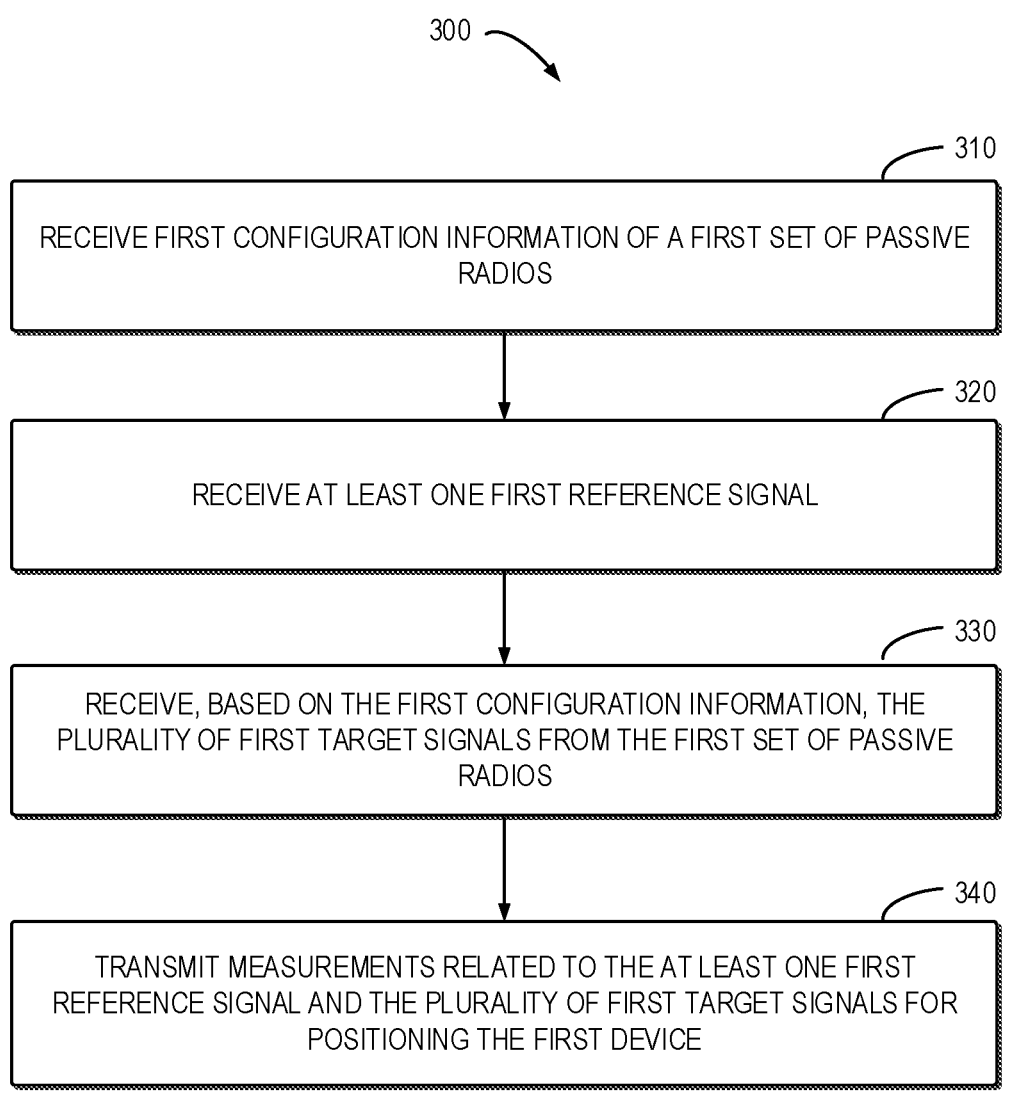

300

310

RECEIVE FIRST CONFIGURATION INFORMATION OF A FIRST SET OF PASSIVE RADIOS

320

RECEIVE AT LEAST ONE FIRST REFERENCE SIGNAL

330

RECEIVE, BASED ON THE FIRST CONFIGURATION INFORMATION, THE PLURALITY OF FIRST TARGET SIGNALS FROM THE FIRST SET OF PASSIVE RADIOS

340

TRANSMIT MEASUREMENTS RELATED TO THE AT LEAST ONE FIRST REFERENCE SIGNAL AND THE PLURALITY OF FIRST TARGET SIGNALS FOR POSITIONING THE FIRST DEVICE

FIG. 3

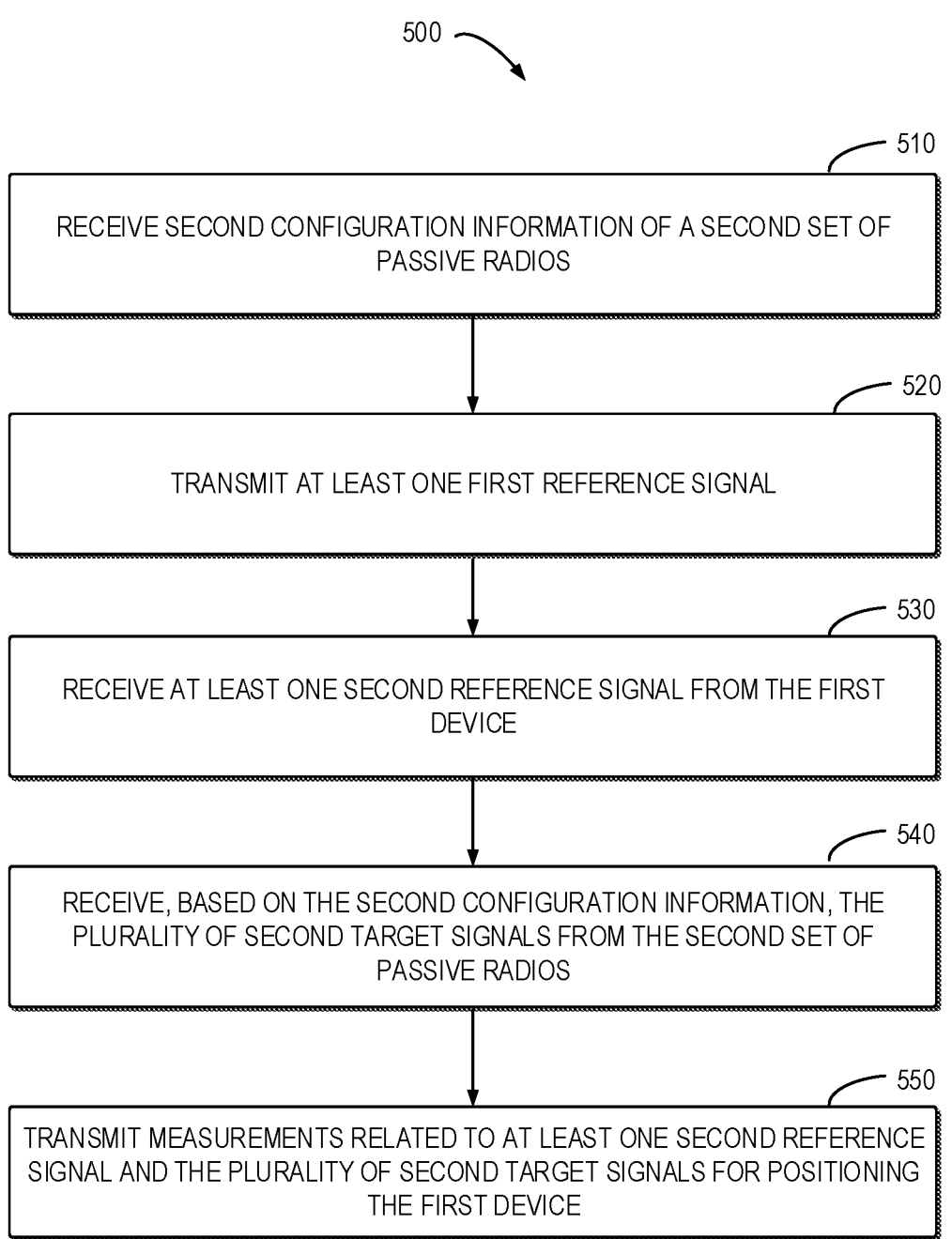

500

510

RECEIVE SECOND CONFIGURATION INFORMATION OF A SECOND SET OF PASSIVE RADIOS

520

TRANSMIT AT LEAST ONE FIRST REFERENCE SIGNAL

530

RECEIVE AT LEAST ONE SECOND REFERENCE SIGNAL FROM THE FIRST DEVICE

540

RECEIVE, BASED ON THE SECOND CONFIGURATION INFORMATION, THE PLURALITY OF SECOND TARGET SIGNALS FROM THE SECOND SET OF PASSIVE RADIOS

550

TRANSMIT MEASUREMENTS RELATED TO AT LEAST ONE SECOND REFERENCE SIGNAL AND THE PLURALITY OF SECOND TARGET SIGNALS FOR POSITIONING THE FIRST DEVICE

FIG. 5

POSITIONING ACCURACY ENHANCEMENTS

FIELD

Various example embodiments of the present disclosure generally relate to the field of telecommunication and in particular, to methods, devices, apparatuses and computer readable storage medium for positioning accuracy enhancements.

BACKGROUND

To locate UE in a communication network, the UE measures positioning signals from multiple transmit receive points (TRPs) and reports the measurements to the location management function (LMF). Before the location estimation can be computed, UE also needs to get spectral allowance and transmit positioning signals towards the multiple TRPs. During the above procedure, latency will be introduced. For Industrial Internet of Things (IIoT), the latency is required to below 10 ms.

In addition, prior to reporting the measurements, UE has to correctly identify the line of sight (LoS) signal and measure its time of arrival. To this end, UE needs to have a good capability for LoS detection. On the other hand, LoS detection is computationally challenging for the UE. Thus, positioning techniques are expected to be improved in terms of latency, computation complexity, while ensuring the positioning accuracy.

SUMMARY

In general, example embodiments of the present disclosure provide a solution of positioning accuracy enhancements.

In a first aspect of the present disclosure, there is provided a first device. The first device comprises at least one processor; and at least one memory storing instructions that, when executed by the at least one processor, cause the first device at least to perform: receiving, from a second device, first configuration information of a first set of passive radios for transmitting a plurality of first target signals in response to receiving a plurality of first reference signals from a third device; receiving, from the third device, at least one first reference signal; upon receiving the at least one first reference signal, receiving, based on the first configuration information, the plurality of first target signals from the first set of passive radios; and transmitting, to the second device, measurements related to the at least one first reference signal and the plurality of first target signals for positioning the first device.

In a second aspect of the present disclosure, there is provided a second device. The second device comprises at least one processor; and at least one memory storing instructions that, when executed by the at least one processor, cause the second device at least to perform: transmitting, to at least one of a first device or a third device, configuration information of passive radios for transmitting a plurality of target signals in response to receiving a plurality of reference signals from the at least one of the first device or the third device, positions of the passive radios known by the second device; and receiving, from the at least one of the first device or the third device, measurements related to at least one reference signal and plurality of target signals.

In a third aspect of the present disclosure, there is provided a third device. The third device comprises at least one processor; and at least one memory storing instructions that, when executed by the at least one processor, cause the third device at least to perform: receiving, from a second device, second configuration information of a second set of passive radios for transmitting a plurality of second target signals in response to receiving a plurality of second reference signals from a first device; upon transmitting at least one first reference signal, receiving at least one second reference signal from the first device; upon receiving the at least one second reference signal, receiving, based on the second configuration information, the plurality of second target signals from the second set of passive radios; and transmitting, to the second device, measurements related to the at least one second reference signal and the plurality of second target signals for positioning the first device.

In a fourth aspect of the present disclosure, there is provided a method. The method comprises: receiving, at a first device and from a second device, first configuration information of a first set of passive radios for transmitting a plurality of first target signals in response to receiving a plurality of first reference signals from a third device; receiving, from the third device, at least one first reference signal; upon receiving the at least one first reference signal, receiving, based on the first configuration information, the plurality of first target signals from the first set of passive radios; and transmitting, to the second device, measurements related to the at least one first reference signal and the plurality of first target signals for positioning the first device.

In a fifth aspect of the present disclosure, there is provided a method. The method comprises: transmitting, at a second device and to at least one of a first device or a third device, configuration information of passive radios for transmitting a plurality of target signals in response to receiving a plurality of reference signals from the at least one of the first device or the third device, positions of the passive radios known by the second device; and receiving, from the at least one of the first device or the third device, measurements related to at least one reference signal and plurality of target signals.

In a sixth aspect of the present disclosure, there is provided a method. The method comprises: receiving, at a third device and from a second device, second configuration information of a second set of passive radios for transmitting a plurality of second target signals in response to receiving a plurality of second reference signals from a first device; upon transmitting at least one first reference signal, receiving at least one second reference signal from the first device; upon receiving the at least one second reference signal, receiving, based on the second configuration information, the plurality of second target signals from the second set of passive radios; and transmitting, to the second device, measurements related to the at least one second reference signal and the plurality of second target signals for positioning the first device.

In a seventh aspect of the present disclosure, there is provided a first apparatus. The first apparatus comprises: means for receiving, from a second apparatus, first configuration information of a first set of passive radios for transmitting a plurality of first target signals in response to receiving a plurality of first reference signals from a third apparatus; means for receiving, from the third apparatus, at least one first reference signal; means for upon receiving the at least one first reference signal, receiving, based on the first configuration information, the plurality of first target signals from the first set of passive radios; and means for transmitting, to the second apparatus, measurements related to the at least one first reference signal and the plurality of first target signals for positioning the first apparatus.

In an eighth aspect of the present disclosure, there is provided a second apparatus. The second apparatus comprises: means for transmitting, to at least one of a first apparatus or a third apparatus, configuration information of passive radios for transmitting a plurality of target signals in response to receiving a plurality of reference signals from the at least one of the first apparatus or the third apparatus, positions of the passive radios known by the second apparatus; and means for receiving, from the at least one of the first apparatus or the third apparatus, measurements related to at least one reference signal and plurality of target signals.

In a ninth aspect of the present disclosure, there is provided a third apparatus. The third apparatus comprises: means for receiving, from a second apparatus, second configuration information of a second set of passive radios for transmitting a plurality of second target signals in response to receiving a plurality of second reference signals from a first apparatus; means for upon transmitting at least one first reference signal, receiving at least one second reference signal from the first apparatus; means for upon receiving the at least one second reference signal, receiving, based on the second configuration information, the plurality of second target signals from the second set of passive radios; and means for transmitting, to the second apparatus, measurements related to the at least one second reference signal and the plurality of second target signals for positioning the first apparatus.

In a tenth aspect of the present disclosure, there is provided a computer readable medium. The computer readable medium comprises instructions stored thereon for causing an apparatus to perform at least the method according to the fourth aspect.

In an eleventh aspect of the present disclosure, there is provided a computer readable medium. The computer readable medium comprises instructions stored thereon for causing an apparatus to perform at least the method according to the fifth aspect.

In a twelfth aspect of the present disclosure, there is provided a computer readable medium. The computer readable medium comprises instructions stored thereon for causing an apparatus to perform at least the method according to the sixth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 3 illustrates a flowchart of a method implemented at a first device according to some example embodiments of the present disclosure;

FIG. 5 illustrates a flowchart of a method implemented at a third device according to some example embodiments of the present disclosure;

Throughout the drawings, the same or similar reference numerals represent the same or similar element.

DETAILED DESCRIPTION

Figure 1:
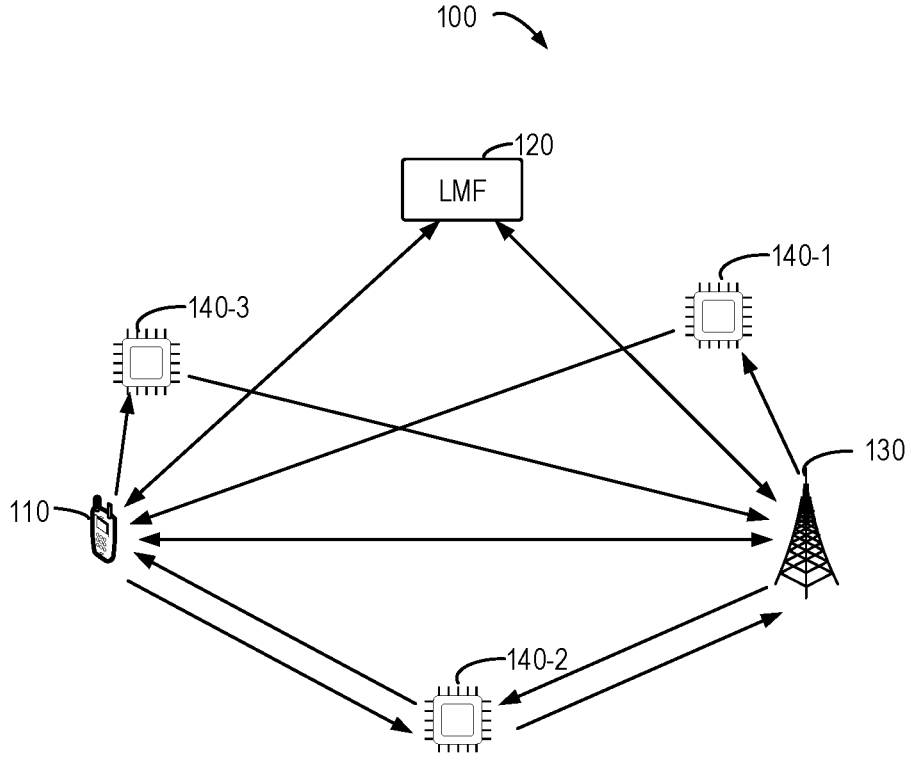
FIG. 1 illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, "at least one of the following: <a list of two or more elements> and "at least one of <a list of two or more elements> and similar wording, where the list of two or more elements are joined by "and" or "or", means at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a Next Generation NodeB (NR NB), a Remote Radio Unit (RRU), a radio header (RH), a remote radio head (RRH), Integrated Access and Backhaul (IAB) node, a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT).

The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

Example Environment

FIG. 1 illustrates an example communication environment 100 in which example embodiments of the present disclosure can be implemented. The communication environment 100 may be a communication system deployed in outdoor or indoor. As shown in FIG. 1, the communication environment 100 includes a first device 110, a second device 120, a third device 130, and a set of passive radios 140-1 to 140-3.

The first device 110 may be a terminal device (e.g., UE), hereinafter which may be also referred to as UE 110. The second device 120 may be an LMF, hereinafter which may be also referred to as LMF 120. The third device 130 may be a network device, for example, a gNB, a TRP and so on, which may be also referred to as a gNB 130 or a TRP 130 hereinafter. The first device 110, the second device 120, and the third device 130 may communicate with each other. In some example embodiments, a link from the third device 130 to the first device 110 is referred to as a downlink (DL), while a link from the first device 110 to the third device 130 is referred to as an uplink (UL). In DL, the third device 130 is a transmitting (TX) device (or a transmitter) and the first device 110 is a receiving (RX) device (or a receiver). In UL, the first device 110 is a TX device (or a transmitter) and the third device 130 is a RX device (or a receiver).

In some example embodiments, the second device 120 may ask the first device 110 to measure first reference signals (e.g., positioning reference signal (PRS)) from the third device 130. Additionally, or alternatively, the second device 120 may ask the third device 130 to measure second reference signals (e.g., sounding reference signal (SRS)) from the first device 110. The first device 110 and third device 130 may report measurements to the second device 120 respectively. The second device 120 may then determine a position of the first device 110 based on the measurement reporting.

The set of passive radios 140-1 to 140-3 may be low power devices or batteryless devices, for example, passive tags. Hereinafter, the set of passive radios 140-1 to 140-3 may be collectively referred to as passive tag 140 or passive radio 140. The passive radio 140 may harness energy from wireless signals transmitted on specific carriers and/or bandwidths, or energy from any other source, such as, solar, wind energy, etc., and charge a simple circuitry that, once activated, it will emit a signal which encodes at least an identity (ID) of the passive radio.

An example architecture around the passive radio 140 may consist of:

(1) an activator that is a device that transmits an activation signal targeted at waking up the passive radio 140;

(2) the passive radio 140 that harnesses energy over a range of frequencies, solar, wind energy or energy from any other source and listens for the activation signal; once the activation signal is detected, the passive radio 140 emits a backscatter signal which may be specific to the passive radio's ID; and (3) a reader that is a device that listens and detects the backscatter signal. It should be understood that the reader may or may not be collocated with the activator.

In some example embodiments, the positions of the third device 130 and the set of passive radios 140-1 to 140-3 are known by the LMF 120, in particular, the latter ones are known as passive anchors. In this case, the set of passive radios 140-1 to 140-3 may act as diversity points for active anchor, i.e., the TRP, which intentionally create the known multipath diversity which can later be exploited in positioning the first device 110.

The passive radios 140 may be full duplex or half duplex. In the example illustrated in FIG. 1, the passive radios 140-1 and 140-3 are half duplex, while the passive 140-2 is full duplex. As shown in FIG. 1, the passive radio 140-1 generates a DL target signal (e.g., a DL-tag signal) in response to hearing a DL signal from the third device 130, which is also referred to as a first target signal hereinafter. The passive radio 140-3 generates a UL target signal (e.g., UL-tag signal) in response to hearing a UL signal from the first device 110, which is also referred to as a second target signal hereinafter. The passive radio 140-2 may generate a corresponding target signal in response to hearing the UL signal or the DL signal.

Accordingly, the first device 110 and the third device 130 may receive and measure the target signals emitted from the passive radios 140-1 to 140-3. The measurements of target signals may then be reported to the LMF 120. For example, the reported measurements of the first and second reference signals may include, but not limited to, receiving and transmitting time difference (i.e., Rx-Tx TD), signal strengths (e.g., RSRP, RSRQ, etc.) associated with X strongest reference signal copies, where X is a predetermined or preconfigured number. Additionally, or alternatively, the reported measurements of the target signals may include, but not limited to, differential Rx-Tx TD, differential signal strengths with respect to the X strongest reference signal copies. The LMF 120 may then determine the position of the first device 110 based on the measurements reported by the first device 110 and the third device 130, which will be discussed in detail below.

It is to be understood that the number of devices, passive radios and their connections shown in FIG. 1 are only for the purpose of illustration without suggesting any limitation. The communication network 100 may include any suitable number of devices configured to implementing example embodiments of the present disclosure. Although not shown, it would be appreciated that one or more additional devices, radios or tags may be located in the communication network 100.

In the following, for the purpose of illustration, some example embodiments are described with the first device 110 operating as the terminal device and the third device 130 operating as the network device. However, in some example embodiments, operations described in connection with a terminal device may be implemented at a network device or other device, and operations described in connection with a network device may be implemented at a terminal device or other device.

Communications in the communication environment 100 may be implemented according to any proper communication protocol(s), comprising, but not limited to, cellular communication protocols of the first generation (1G), the second generation (2G), the third generation (3G), the fourth generation (4G), the fifth generation (5G), the sixth generation (6G), and the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFT-s-OFDM) and/or any other technologies currently known or to be developed in the future.

Various Internet of everything (IoT) applications, such as, narrow band IoT (NB-IoT), enhanced Machine-Type Communication (eMTC), NR reduced capacity (NR RedCap), etc. have been developed in 5G NR to satisfy requirements on low cost and low power consumption for wide area IoT communications. These IoT devices usually consume tens or hundreds of milliwatts power during transceiving.

To achieve IoT applications, IoT devices with ten or even a hundred times lower cost and power consumption are to be widely developed and adopted, especially for a large number of applications requiring batteryless devices. Passive IoTs has been proposed as one of the implementations of such batteryless devices.

Work Principle and Example Signaling for Communication

As previously mentioned, positioning techniques are expected to be improved in terms of latency, computation complexity, and positioning accuracy. According to some example embodiments of the present disclosure, there is provided a positioning solution. In this solution, additional reference signals provided by passive radios are enabled for positioning UE.

In particular, a first device receives, from a second device, first configuration information of a first set of passive radios for transmitting a plurality of first target signals in response to receiving a plurality of first reference signals from a third device. The positions of the first set of passive radios are known by the second device. The first device receives, from the third device, at least one first reference signal. Upon receiving the at least one first reference signal, the first device receives the plurality of first target signals from the first set of passive radios based on the first configuration information. The first device then transmits first reference signal measurements and first target signal measurements to the second device for positioning the first device.

In this way, additional positioning reference signals are enabled, which may be especially useful for indoor positioning. By adopting the passive radios, non-LoS detection is supported for positioning. As such, positioning accuracy can be improved, while the latency and computation complexity can be reduced.

Example embodiments of the present disclosure will be described in detail below with reference to the accompanying drawings.

Figure 2:
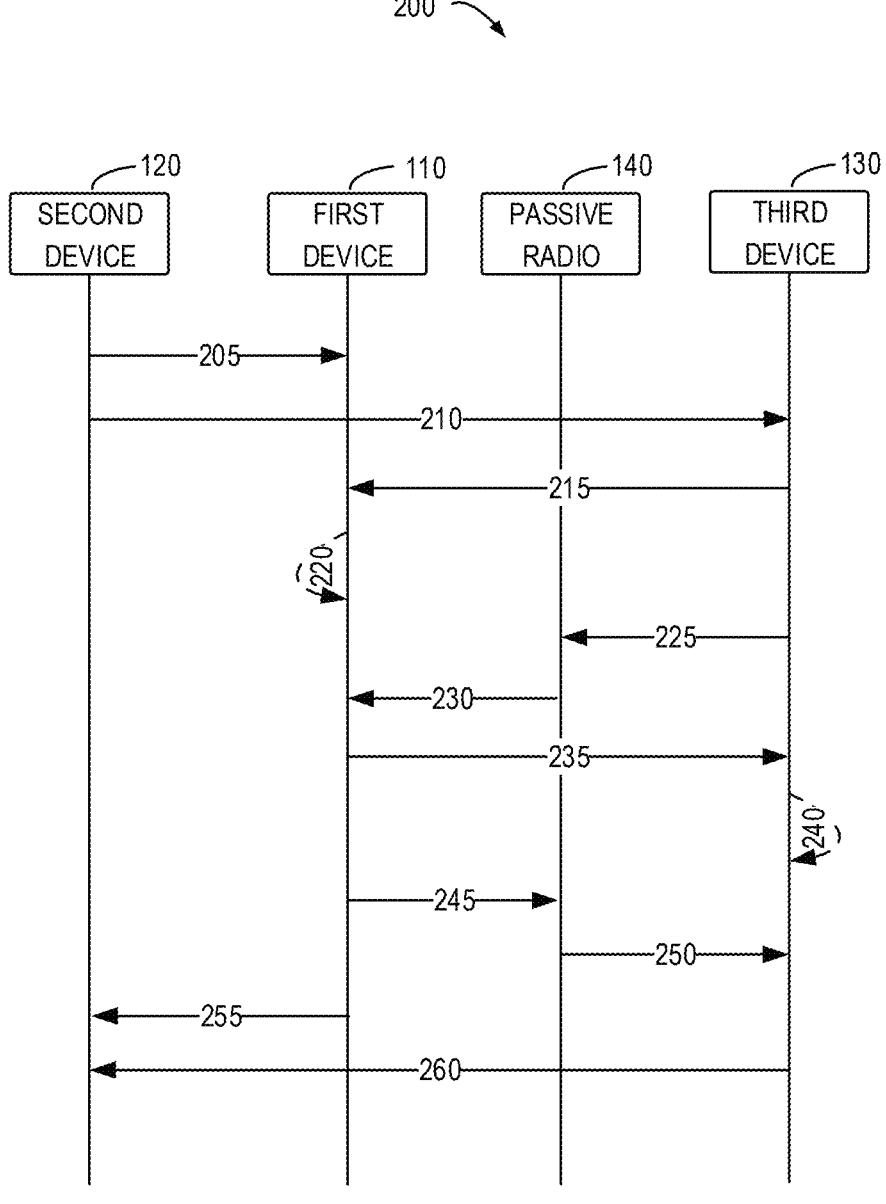
FIG. 2 illustrates a signaling chart for communication according to some example embodiments of the present disclosure.

Reference is now made to FIG. 2, which illustrates a signaling chart 200 for communication according to some example embodiments of the present disclosure. As shown in FIG. 2, the signaling chart 200 involves the first device 110, the second device 120, the third device 130 and the passive radio 140. For the purpose of discussion, reference is made to FIG. 1 to describe the signaling flow 200.

Although one first device 110 and one third device 130 are illustrated in FIG. 2, it would be appreciated that there may be a plurality of first devices performing similar operations as described with respect to the first device 110 below and a plurality of third devices performing similar operations as described with respect to the third device 130 below. In addition, in practice, there may be less or more passive radios or passive devices than the passive radios 140-1 to 140-3 shown in FIG. 1, which depends on a network deployment, positioning requirements, etc.

Each of the passive radios 140-1 to 140-3 may be identified by a corresponding ID. The positions of the passive radios 140-1 to 140-3 may be known by the second device 120. As discussed above, the passive radio 140 listens for activation signals, e.g., a first reference signal from the third device 130, a second reference signal from the first device 110, etc.

In some example embodiments, the first reference signal may be a DL reference signal, e.g., PRS. Additionally, or alternatively, the second reference signal may be a UL reference signal, e.g., SRS. In this case, the first reference signal and the second reference signal act as both radio activators and positioning signals. It should be understood that any other DL or UL signal different from PRS, SRS may also be applicable to implementations of the example embodiments. Thus, the present disclosure is not limited in this regard.

Once the activation signal is detected, the passive radio 140 may transmit a corresponding target signal. In some example embodiments, the target signal may be associated with a corresponding carrier or bandwidth. Additionally, or alternatively, in some example embodiments, the target signal may be identified by a corresponding unique signature associated with the ID of the respective passive radio 140. For a full duplex passive radio (e.g., the passive radio 140-2), a first target signal (e.g., a DL-tag signal) transmitted in response to the first reference signal may be different from a second target signal (e.g., a UL-tag signal) transmitted in response to the second reference signal.

In other words, a target signal may be specific to a respective activation signal stimulus, and thus there is a mapping between target signals and activation signals, i.e., the reference signals. The mapping may be determined by the LMF 120. In some cases, a first mapping of the first target signal to the first reference signal may be different from a second mapping of the second target signal to the second reference signal. Additionally, or alternatively, in some cases, the passive anchors may only be adopted for either DL or UL, thus only one of the first mapping or second mapping is used.

In the process 200, the second device 120 transmits configuration information of the passive radio 140 to at least one of the first device 110 or the third device 130. The configuration information may indicate the mapping of the target signals and the reference signals.

Since the passive radio 140 is not necessarily adopted for both UL and DL, the second device 120 may transmit configuration information to either one or both of the first device 110 and the third device 130. Additionally, the passive radio 140 adopted for UL may not necessarily be the same as the passive radio 140 adopted for DL. In this case, the configuration information (also referred to as first configuration information or DL passive radio configuration information) for the first device 110 may be different from the configuration information (also referred to as second configuration information or UL passive radio configuration information) for the third device 130.

In some example embodiments where a first set of passive radio 140 is adopted for DL, which includes passive radios 140-1 and 140-2 in the example shown in FIG. 1, the second device 120 may transmit 205 the first configuration information of the first set of passive radio 140 to the first device 110. In this case, the first set of passive radio 140 may transmit a plurality of first target signals in response to receiving a plurality of first reference signals from the third device 130.

For example, the first configuration information may be carried via an LTE Positioning Protocol (LPP) information element (IE). The first configuration information may indicate a correspondence between the first target signal and the first reference signal, i.e., the first mapping of the first target signal to the first reference signal. In some example embodiments, the first mapping may indicate at least one of a DL-tag signal code, a carrier, a bandwidth, a waveform, a time pattern, a frequency pattern of the first target signal code, signatures associated with IDs of the first set of passive radio 140, and so on.

Additionally, the first configuration information may indicate a first time window for listening the plurality of first target signals. The first time window may be applied by the first device 110 for detecting the first target signals. Such a listening window may be dimensioned in relation to a transmission time of the first reference signal and a first time interval $T_1$ that the first set of passive radio 140 takes between detecting the first reference signal and generating a corresponding first target signal. The first time interval T 1 may be specific to the passive device implementation, that is, depending on whether the passive radio is full or half duplex, and may be known by the LMF 120.

Additionally, or alternatively, in some example embodiments where a second set of passive radio 140 is adopted for UL, which includes passive radios 140-2 and 140-3 in the example shown in FIG. 1, the second device 120 may transmit 210 the second configuration information of the second set of passive radio 140 to the third device 130. In this case, the second set of passive radio 140 may transmit a plurality of second target signals in response to receiving a plurality of second reference signals from the first device 110. Depending on whether the passive radio 140 is full duplex or half duplex, the first set of passive radio 140 may or may not overlap with the second set of passive radio 140.

Likewise, the second configuration information may be carried via a LPP IE. The second configuration information may indicate a correspondence between the second target signal and the second reference signal, i.e., the second mapping of the second target signal to the second reference signal. In some example embodiments, the second mapping may indicate at least one of a UL-tag signal code, a carrier, a bandwidth, a waveform, a time pattern, a frequency pattern of the second target signal code, signatures associated with IDs of the second set of passive radio 140, and so on.

Additionally, the second configuration information may indicate a second time window for listening the plurality of second target signals. The second time window may be applied by the third device 130 for detecting the second target signals. Likewise, such a listening window may be dimensioned in relation to a transmission time of the second reference signal and a second time interval $T_2$ that the second set of passive radio 140 takes between detecting the second reference signal and generating a corresponding second target signal. The second time interval $T_2$ may be specific to the passive device implementation, that is, depending on whether the passive radio is full or half duplex, and may be known by the LMF 120.

In some example embodiments, the mapping may be unique to a given area. For example, two far apart passive radios may generate the same target signal in response to a PRS if the two passive radios cannot be simultaneously heard by the same radio receiver, i.e., if the LMF 120 can ascertain which passive radio generated the target signal in a respective area of interest, which is similar to a frequency reuse scheme.

In some example embodiments, the second device 120 may ask the first device 110 to perform positioning measurement. For example, the second device 120 may transmit a first measurement indication of the at least one first reference signal to the first device 110. By way of example, the first device 110 may be informed by the first measurement indication of measuring the at least one first reference signal (e.g., the arrival time), and reporting Rx-Tx time differences and signal strengths associated with the $X_1$ strongest copies of the first reference signal, where $X_1$ is a predetermined or preconfigured number. The signal strength may be characterized by Reference Signal Received Power (RSRP), Reference Signal Received quality (RSRQ), and so on.

In a case where the passive anchors are adopted for DL, the second device 120 may further transmit a second measurement indication of the plurality of first target signals to the first device 110. For example, the second measurement indication may be carried via a LPP IE. The first measurement indication and the second measurement indication may be transmitted via a same message or via separate messages.

By way of example, the first device 110 may be informed by the second measurement indication of measuring the first target signals (e.g., the arrival time), and reporting differential Rx-Tx time differences and differential signal strengths with respect to the $X_1$ strongest copies of the first reference signal.

Additionally, or alternatively, the second device 120 may ask the third device 130 to perform positioning measurement. For example, the second device 120 may transmit a third measurement indication of the at least one second reference signal to the third device 130. By way of example, the third device 130 may be informed by the third measurement indication of measuring the at least one second reference signal (e.g., the arrival time), and reporting Rx-Tx time differences and signal strengths (e.g., RSRP, RSRQ, etc.) associated with the $X_2$ strongest copies of the second reference signal, where $X_2$ is a predetermined or preconfigured number.

In a case where the passive anchors are adopted for UL, the second device 120 may further transmit a fourth measurement indication of the plurality of second target signals to the third device 130. For example, the fourth measurement indication may be carried via a LPP IE. The third measurement indication and the fourth measurement indication may be transmitted via a same message or via separate messages.

By way of example, the third device 110 may be informed by the fourth measurement indication of measuring the second target signals (e.g., the arrival time), and reporting differential Rx-Tx time differences and differential signal strengths with respect to the $X_2$ strongest copies of the second reference signal.

The third device 130 transmits a plurality of first reference signal, which may be propagated via multipaths between the first device 110 and the third device 130 including LoS and non-LoS. Accordingly, the first device 110 receives 215 at least one first reference signal via LoS.

In some example embodiments, upon receiving the at least one first reference signal, the first device 110 may determine 220, based on the first mapping, a plurality of first target signals to be transmitted from the first set of passive radio 140. By way of example, the first device 110 may detect an ID of the first reference signal (e.g., a dl-PRS-Sequence ID), and check the first mapping to determine the ID of the first target signal (e.g., the DL tag signal ID) that corresponds to the ID of the first reference signal. Hence, the first device 110 may detect for the first target signal during the first time window. In other words, if a PRS is detected, the detection of the corresponding DL target signal will be triggered. By doing so, the UE avoids to exhaustively trying to detect all passive radios, but only for those associated with the PRS that has already been detected.

Additionally, the first set of passive radio 140 receives 225 a plurality of first reference signals via non-LoS. In response to the plurality of first reference signals, the first set of passive radio 140 transmits 230 a plurality of first target signals.

Accordingly, the first device 110 may measure the Rx-Tx TDs and signal strengths for the at least one first reference signal based on the first measurement indication. Additionally, or alternatively, the first device 110 may further measure differential Rx-Tx TD and differential signal strengths associated with the plurality of first target signals based on the second measurement indication. In some example embodiments, the differential Rx-Tx TD associated with DL target signal, denoted by Rx-Tx $\text{TD}_{diff1}$, may be determined as below:

$$\text{Rx-Tx TD}_{diff1} = \text{TD (strongest PRS)} - \text{TD (DL target signal)} \tag{1}$$

In some example embodiments, once the measurements are completed, the first device 110 may transmit a plurality of second reference signal, which may be propagated via multipaths between the first device 110 and the third device 130 including LoS and non-LoS. Accordingly, the third device 130 receives 235 at least one second reference signal via LoS.

In some example embodiments, upon receiving the at least one second reference signal, the third device 130 may determine 240, based on the second mapping, a plurality of second target signals to be transmitted from the second set of passive radio 140. By way of example, the third device 130 may detect an ID of the second reference signal (e.g., the SRS ID), and check the second mapping to determine the ID of the second target signal (e.g., the UL target signal ID) that corresponds to the ID of the second reference signal. Hence, the third device 130 may detect for the second target signal during the second time window. In other words, if an SRS is detected, the detection of the corresponding UL target signal will be triggered. By doing so, the gNB avoids to exhaustively trying to detect all passive radios, but only for those associated with the SRS that has already been detected.

Additionally, the second set of passive radios 140 for UL receives 245 a plurality of second reference signals via non-LoS. In response to the plurality of second reference signals, the second set of passive radio 140 transmits 250 a plurality of second target signals.

Accordingly, the third device 130 may measure the Rx-Tx TDs and signal strengths for the at least one second reference signal based on the third measurement indication. Additionally, or alternatively, the third device 130 may further measure differential Rx-Tx TD and differential signal strengths associated with the plurality of second radios signals based on the fourth measurement indication. In some example embodiments, the differential Rx-Tx TD associated with UL target signal, denoted by Rx-Tx $TD_{diff2}$, may be determined as below:

$$Rx\text{-}Tx\ TD_{diff2}=TD\ (\text{strongest SRS})-TD\ (\text{UL target signal}) \qquad (2)$$

The first device 110 then transmits 255 to the second device 120 the measurements related to the at least one first reference signal and the plurality of first target signals, for example, first reference signal measurements (e.g., $X_1$ Rx-Tx TDs, signal strengths for PRS, etc.), first target signal measurements (e.g., Rx-Tx TDs, signal strengths for the first target signals), differential measurements (e.g., differential Rx-Tx TDs, differential signal strengths for DL target signals with respect to the $X_1$ strongest copies), etc. In some example embodiments, the first target signal measurements may be reported via a LPP IE.

Additionally, or alternatively, the third device 130 then transmits 260 to the second device 120 the measurements related to the at least one second reference signal and the plurality of second target signals, for example, second reference signal measurements (e.g., $X_2$ Rx-Tx TDs, signal strengths for SRS, etc.) second target signal measurements (e.g., Rx-Tx TDs, signal strengths for the second target signals), differential measurements (e.g., differential Rx-Tx TDs, differential signal strengths for UL target signals with respect to the $X_2$ strongest copies), etc. In some example embodiments, the second target signal measurements may be reported via a LPP IE.

In some example embodiments, after obtaining target signal measurements, the second device 120 may compare the signal strengths of candidate LoS between the first device 110 and the third device 130 with the target signal strengths. Based on the comparison result, the second device 120 may then select a LoS for the TRP-UE link.

Additionally, or alternatively, the second device 110 may determine the position of the first device 110 based on the LoS measurements for the TRP, the target signal measurements as well as the know positions of the third device 130 and corresponding passive radio 140. In this way, the positioning accuracy is improved.

It should be understood that some of the steps in process 200 are optional or can be omitted, and the order of the steps is given for an illustrative purpose. For example, the step 220 may be performed in parallel to steps 225 and 230, or step 255 may be performed before or in parallel to steps 245 and 250. Thus, the embodiments of the present disclosure are not limited in this regard.

According to the example embodiments of the present disclosure, the LMF pairs DL/UL positioning signals with DL/UL-tag signals. In this way, a positioning framework that employs passive radios to enrich the channel diversity between a TRP and a UE is enabled. Furthermore, a round-trip time (RTT) positioning scheme can be realized by using a single TRP and at least one passive radios, and Rx-Tx timing and power measurements of multipaths and of passive radio signals. Such a positioning scheme can provide improved positioning accuracy without aggregating the power consumption or signaling overhead, as the passive radios are batteryless devices.

Example Methods

FIG. 3 illustrates a flowchart of a method 300 implemented at a first device according to some example embodiments of the present disclosure. For example, the first device may include a terminal device. For the purpose of discussion, the method 300 will be described from the perspective of the first device 110 in FIG. 1.

At block 310, the first device 110 receives, from the second device 120, first configuration information of a first set of passive radios 140 for transmitting a plurality of first target signals in response to receiving a plurality of first reference signals from the third device 130. In the example shown in FIG. 1, the first set of passive radios 140 may include the passive radios 140-1 and 140-2.

In some example embodiments, the first configuration information may comprise at least one of the following: a first mapping of a first target signal to a first reference signal, a first time window for listening the plurality of first target signals.

In some example embodiments, the first mapping may indicate at least one of the following: a carrier of the first target signal, a bandwidth of the first target signal, a waveform of the first target signal, a time pattern of the first target signal, a frequency pattern of the first target signal, IDs of the first set of passive radios.

At block 320, the first device 110 receives, from the third device 130, at least one first reference signal. In some example embodiments, receiving the plurality of first target signals may comprise: upon receiving the at least one first reference signal, determining the plurality of first target signals to be received from the first set of passive radios based on the first mapping; and receiving the plurality of first target signals during the first time window.

Upon receiving the at least one first reference signal, at block 330, the first device 110 receives the plurality of first target signals from the first set of passive radios based on the first configuration information.

At block 340, the first device 110 transmits, to the second device 120, measurements related to the at least one first reference signal and the plurality of first target signals for positioning the first device 110.

In some example embodiments, the method 300 may further comprise: receiving, from the second device 120, a first measurement indication of the at least one first reference signal; and measuring, based on the first measurement indication, at least one receiving and transmitting time difference and at least one signal strength for the at least one first reference signal.

In some example embodiments, the method 300 may further comprise: receiving, from the second device 120, a second measurement indication of the plurality of first target signals; and measuring, based on the second measurement indication, at least one of the following:

receiving and transmitting time differences and signal strengths for the plurality of first target signals, differential receiving and transmitting time differences and differential signal strengths associated with the plurality of first target signals.

In some example embodiments, the differential receiving and transmitting time differences associated with the plurality of first target signals may comprise differential receiving and transmitting time differences between time differences of the at least one first reference signal and time differences of the plurality of first target signals.

In some example embodiments, the differential signal strengths associated with the plurality of first target signals may comprise differences between at least one signal strength of the at least one first reference signal and signal strengths of the plurality of first target signals.

In some example embodiments, the measurements related to the at least one first reference signal and the plurality of first target signals comprise at least one of the following:

receiving and transmitting time differences and signal strengths of a first number of the first reference signals, and receiving and transmitting time differences and signal strengths for the plurality of first target signals, or differential receiving and transmitting time differences and differential signal strengths between the plurality of first target signals and the first number of the first reference signals.

In some example embodiments, the method 300 may further comprise: transmitting, to a second set of passive radios 140, a plurality of second reference signals, the second set of passive radios 140 being caused to transmit a plurality of second target signals to the third device 130 in response to receiving the plurality of second reference signals. In the example shown in FIG. 1, the second set of passive radios 140 may include the passive radios 140-2 and 140-3. Depending on whether the passive radio 140 is full duplex or half duplex, the first set of passive radios 140 may or may not overlap with the second set of passive radios 140.

In some example embodiments, the plurality of first reference signals may comprise a plurality of PRSs. Additionally, or alternatively, in some example embodiments, the plurality of second reference signals may comprise a plurality of SRSs.

In some example embodiments, the first device 110 comprises a terminal device, the second device 120 comprises a location management device (e.g., LMF), and the third device 130 comprises a network device (e.g., gNB, TRP, etc.).

Figure 4:
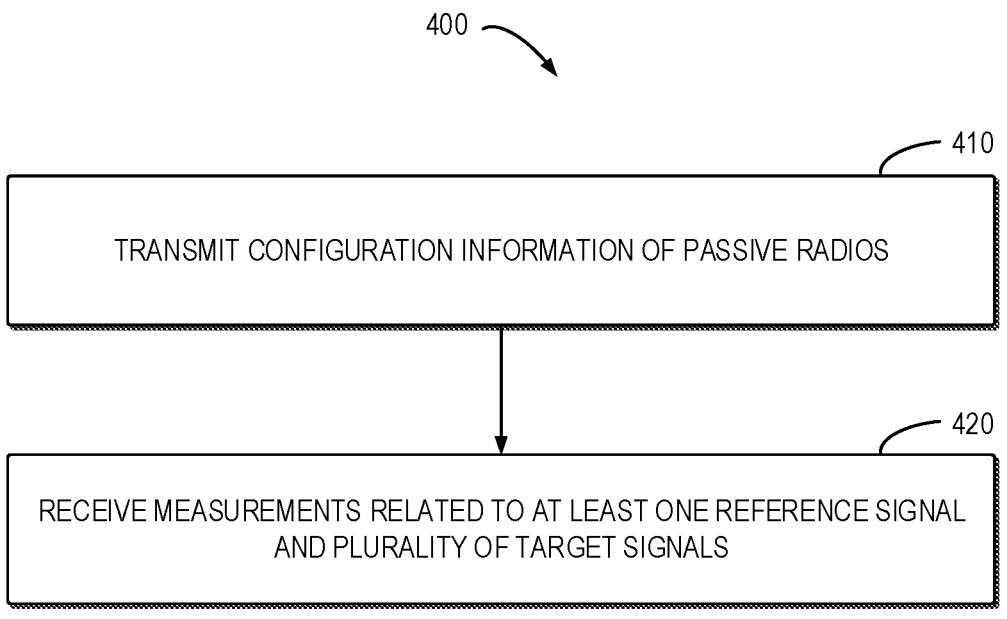
FIG. 4 illustrates a flowchart of a method implemented at a second device according to some example embodiments of the present disclosure.

FIG. 4 illustrates a flowchart of an example method 400 implemented at a second device in accordance with some example embodiments of the present disclosure. For example, the second device may include a network device with location management function (LMF). For the purpose of discussion, the method 400 will be described from the perspective of the second device 120 in FIG. 1.

At 410, the second device 120 transmits, to at least one of the first device 110 or the third device 130, configuration information of passive radios 140 for transmitting a plurality of target signals in response to receiving a plurality of reference signals from the at least one of the first device 110 or the third device 130. The positions of the passive radios 140 may be known by the second device 120.

At 420, the second device 120 receives, from the at least one of the first device 110 or the third device 130, measurements related to at least one reference signal and plurality of target signals.

In some example embodiments, the configuration information of passive radios 140 may comprises first configuration information of a first set of the passive radios for transmitting a plurality of first target signals in response to receiving a plurality of first reference signals from the third device 130. In these embodiments, transmitting the configuration information may comprise transmitting the first configuration information to the first device 110.

Additionally, or alternatively, in the above embodiments, receiving the measurements related to at least one reference signal and plurality of target signals comprises: receiving, from the first device 110, measurements related to at least one first reference signal and the plurality of first target signals.

In some example embodiments, the method 400 may further comprise: transmitting, to the first device 110, a first measurement indication of the at least one first reference signal and a second measurement indication of the plurality of first target signals. In these embodiments, the measurements may comprise at least one of the following:

at least one receiving and transmitting time difference and at least one signal strength for the at least one first reference signal, receiving and transmitting time differences and signal strengths for the plurality of first target signals, differential receiving and transmitting time differences and differential signal strengths associated with the plurality of first target signals.

In some example embodiments, the first configuration information may comprise at least one of the following: a first mapping of a first target signal to a first reference signal, a first time window for listening the plurality of first target signals.

In some example embodiments, the first mapping indicates at least one of the following: a carrier of the first target signal, a bandwidth of the first target signal, a waveform of the first target signal, a time pattern of the first target signal, a frequency pattern of the first target signal, IDs of the first set of passive radios.

In some example embodiments, the configuration information of passive radios may comprise second configuration information of a second set of the passive radios for transmitting a plurality of second target signals in response to receiving a plurality of second reference signals from the third device 130. In these embodiments, transmitting the configuration information may comprise transmitting the second configuration information to the third device 130.

Additionally, or alternatively, in the above embodiments, receiving the measurements related to at least one reference signal and plurality of target signals may comprise: receiving, from the third device 130, measurements related to at least one second reference signal and the plurality of second target signals.

In some example embodiments, the method 400 may further comprise: transmitting, to the third device 130, a third measurement indication of the at least one second reference signal and a fourth measurement indication of the plurality of second target signals. In these embodiments, the measurements may comprise at least one of the following:

at least one receiving and transmitting time difference and at least one signal strength for the at least one second reference signal, receiving and transmitting time differences and signal strengths for the plurality of second target signals, differential receiving and transmitting time differences and differential signal strengths associated with the plurality of second target signals.

In some example embodiments, the second configuration information comprises at least one of the following: a second mapping of a second target signal to a second reference signal, a second time window for listening the plurality of second target signals.

In some example embodiments, the second mapping may indicate at least one of the following: a carrier of the second target signal, a bandwidth of the second target signal, a waveform of the second target signal, a time pattern of the second target signal, a frequency pattern of the second target signal, IDs of the second set of passive radios.

In some example embodiments, the method 400 may further comprise: comparing a corresponding one of the at least one signal strength for the at least one first reference signal or the at least one signal strength for the at least one second reference signal with a corresponding one of the differential signal strengths associated with the plurality of first target signals or the differential signal strengths associated with the plurality of second target signals; and selecting, a line of sight for the first device 110 and the third device 130 based on a comparison result.

In some example embodiments, the method 400 may further comprise: determining a position of the first device 110 based on the measurements and the positions of the passive radios 140.

In some example embodiments, the first device 110 comprises a terminal device, the second device 120 comprises a location management device, and the third device 130 comprises a network device.

FIG. 5 illustrates a flowchart of an example method 500 implemented at a third device in accordance with some example embodiments of the present disclosure. For example, the third device may include a terminal device. For the purpose of discussion, the method 500 will be described from the perspective of the third device 130 in FIG. 1.

At block 510, the third device 130 receives, from a second device 120, second configuration information of a second set of passive radios for transmitting a plurality of second target signals in response to receiving a plurality of second reference signals from a first device 110.

At block 520, the third device 130 transmits at least one first reference signal to the first device 110. In some example embodiments, the first reference signal may comprise a positioning reference signal, and the second reference signal may comprise a sounding reference signal.

Upon transmitting at least one first reference signal, at block 530, the third device 130 receives at least one second reference signal from the first device 110.

Upon receiving the at least one second reference signal, at block 540, the third device 130 receives, based on the second configuration information, the plurality of second target signals from the second set of passive radios.

At block 550, the third device 130 transmits, to the second device 120, measurements related to the at least one second reference signal and the plurality of second target signals for positioning the first device 110.

In some example embodiments, the second configuration information may comprise at least one of the following: a second mapping of a second target signal to a second reference signal, a second time window for listening the plurality of second target signals.

In some example embodiments, the second mapping may indicate at least one of the following: a carrier of the second target signal, a bandwidth of the second target signal, a waveform of the second target signal, a time pattern of the second target signal, a frequency pattern of the second target signal, IDs of the second set of passive radios.

In some example embodiments, receiving the plurality of second target signals may comprise: upon receiving the at least one second reference signal, determining the plurality of second target signals to be received from the second set of passive radios based on the second mapping; and receiving the plurality of second target signals during the second time window.

In some example embodiments, the method 500 may further comprise: receiving, from the second device 120, a third measurement indication of the at least one second reference signal; and measuring, based on the third measurement indication, at least one receiving and transmitting time difference and at least one signal strength for the at least one second reference signal.

In some example embodiments, the method 500 may further comprise: receiving, from the second device 120, a fourth measurement indication of the plurality of second target signals; and measuring, based on the fourth measurement indication, at least one of the following:

receiving and transmitting time differences and signal strengths for the plurality of second target signals, differential receiving and transmitting time differences and differential signal strengths associated with the plurality of second target signals.

In some example embodiments, the differential receiving and transmitting time differences associated with the plurality of second target signals may comprise differential receiving and transmitting time differences between time differences of the at least one second reference signal and time differences of the plurality of second target signals.

In some example embodiments, the differential signal strengths associated with the plurality of second target signals may comprise differences between at least one signal strength of the at least one second reference signal and signal strengths of the plurality of second target signals.

In some example embodiments, the measurements related to the at least one second reference signal and the plurality of the second target signals comprise at least one of the following:

receiving and transmitting time differences and signal strengths of a second number of the second reference signals, and receiving and transmitting time differences and signal strengths for the plurality of second target signals, or differential receiving and transmitting time differences and differential signal strengths between the plurality of second target signals and the second number of the second reference signals.

In some example embodiments, the method 500 may further comprise: transmitting, to a first set of passive radios, a plurality of first reference signals, the first set of passive radios caused to transmit a plurality of first target signals to the first device 110 in response to receiving the plurality of first reference signals.

In some example embodiments, the first device 110 comprises a terminal device, the second device 120 comprises a location management device, and the third device 130 comprises a network device.

Example Apparatus, Device and Medium

In some example embodiments, a first apparatus capable of performing any of the method 300 (for example, the first device 110 in FIG. 1) may comprise means for performing the respective operations of the method 300. The means may be implemented in any suitable form. For example, the means may be implemented in a circuitry or software module. The first apparatus may be implemented as or included in the first device 110 in FIG. 1.

In some example embodiments, the first apparatus comprises: means for receiving, from a second apparatus, first configuration information of a first set of passive radios for transmitting a plurality of first target signals in response to receiving a plurality of first reference signals from a third apparatus; means for receiving, from the third apparatus, at least one first reference signal; means for upon receiving the at least one first reference signal, receiving, based on the first configuration information, the plurality of first target signals from the first set of passive radios; and means for transmitting, to the second apparatus, measurements related to the at least one first reference signal and the plurality of first target signals for positioning the first apparatus.

In some example embodiments, the first configuration information comprises at least one of the following: a first mapping of a first target signal to a first reference signal, a first time window for listening the plurality of first target signals.

In some example embodiments, the first mapping indicates at least one of the following: a carrier of the first target signal, a bandwidth of the first target signal, a waveform of the first target signal, a time pattern of the first target signal, a frequency pattern of the first target signal, identities of the first set of passive radios.

In some example embodiments, the means for receiving the plurality of first target signals comprises: means for upon receiving the at least one first reference signal, determining the plurality of first target signals to be received from the first set of passive radios based on the first mapping; and means for receiving the plurality of first target signals during the first time window.

In some example embodiments, the first apparatus further comprises: means for receiving, from the second apparatus, a first measurement indication of the at least one first reference signal; and means for measuring, based on the first measurement indication, at least one receiving and transmitting time difference and at least one signal strength for the at least one first reference signal.

In some example embodiments, the first apparatus further comprises: means for receiving, from the second apparatus, a second measurement indication of the plurality of first target signals; and means for measuring, based on the second measurement indication, at least one of the following: receiving and transmitting time differences and signal strengths for the plurality of first target signals, differential receiving and transmitting time differences and differential signal strengths associated with the plurality of first target signals.

In some example embodiments, the differential receiving and transmitting time differences associated with the plurality of first target signals comprise differential receiving and transmitting time differences between time differences of the at least one first reference signal and time differences of the plurality of first target signals.

In some example embodiments, the differential signal strengths associated with the plurality of first target signals comprise differences between at least one signal strength of the at least one first reference signal and signal strengths of the plurality of first target signals.

In some example embodiments, the measurements related to the at least one first reference signal and the plurality of first target signals comprise at least one of the following: receiving and transmitting time differences and signal strengths of a first number of the first reference signals, and receiving and transmitting time differences and signal strengths for the plurality of first target signals, or differential receiving and transmitting time differences and differential signal strengths between the plurality of first target signals and the first number of the first reference signals.

In some example embodiments, the first apparatus further comprises: means for transmitting, to a second set of passive radios, a plurality of second reference signals, the second set of passive radios being caused to transmit a plurality of second target signals to the third apparatus in response to receiving the plurality of second reference signals.

In some example embodiments, the plurality of first reference signals comprises a plurality of positioning reference signals, and the plurality of second reference signals comprises a plurality of sounding reference signals.

In some example embodiments, the first apparatus comprises a terminal device, the second apparatus comprises a location management device, and the third apparatus comprises a network device.

In some example embodiments, a second apparatus capable of performing any of the method 400 (for example, the second device 120 in FIG. 1) may comprise means for performing the respective operations of the method 400. The means may be implemented in any suitable form. For example, the means may be implemented in a circuitry or software module. The second apparatus may be implemented as or included in the second device 120 in FIG. 1.

In some example embodiments, the second apparatus comprises: means for transmitting, to at least one of a first apparatus or a third apparatus, configuration information of passive radios for transmitting a plurality of target signals in response to receiving a plurality of reference signals from the at least one of the first apparatus or the third apparatus, positions of the passive radios known by the second apparatus; and means for receiving, from the at least one of the first apparatus or the third apparatus, measurements related to at least one reference signal and plurality of target signals.

In some example embodiments, the configuration information of passive radios comprises first configuration information of a first set of the passive radios for transmitting a plurality of first target signals in response to receiving a plurality of first reference signals from the third apparatus. The means for transmitting the configuration information comprises: means for transmitting the first configuration information to the first apparatus.

In some example embodiments, the means for receiving the measurements related to at least one reference signal and plurality of target signals comprises: receiving, from the first apparatus, measurements related to at least one first reference signal and the plurality of first target signals.

In some example embodiments, the second apparatus further comprises: means for transmitting, to the first apparatus, a first measurement indication of the at least one first reference signal and a second measurement indication of the plurality of first target signals, wherein the measurements comprise at least one of the following: at least one receiving and transmitting time difference and at least one signal strength for the at least one first reference signal, receiving and transmitting time differences and signal strengths for the plurality of first target signals, differential receiving and transmitting time differences and differential signal strengths associated with the plurality of first target signals.

In some example embodiments, the first configuration information comprises at least one of the following: a first mapping of a first target signal to a first reference signal, a first time window for listening the plurality of first target signals.

In some example embodiments, the first mapping indicates at least one of the following: a carrier of the first target signal, a bandwidth of the first target signal, a waveform of the first target signal, a time pattern of the first target signal, a frequency pattern of the first target signal, identities of the first set of passive radios.

In some example embodiments, the configuration information of passive radios comprises second configuration information of a second set of the passive radios for transmitting a plurality of second target signals in response to receiving a plurality of second reference signals from the third apparatus. The means for transmitting the configuration information comprises: means for transmitting the second configuration information to the third apparatus.

In some example embodiments, the means for receiving the measurements related to at least one reference signal and plurality of target signals comprises: means for receiving, from the third apparatus, measurements related to at least one second reference signal and the plurality of second target signals.

In some example embodiments, the second apparatus further comprises: means for transmitting, to the third apparatus, a third measurement indication of the at least one second reference signal and a fourth measurement indication of the plurality of second target signals, wherein measurements comprise at least one of the following: at least one receiving and transmitting time difference and at least one signal strength for the at least one second reference signal, receiving and transmitting time differences and signal strengths for the plurality of second target signals, differential receiving and transmitting time differences and differential signal strengths associated with the plurality of second target signals.

In some example embodiments, the second configuration information comprises at least one of the following: a second mapping of a second target signal to a second reference signal, a second time window for listening the plurality of second target signals.

In some example embodiments, the second mapping indicates at least one of the following: a carrier of the second target signal, a bandwidth of the second target signal, a waveform of the second target signal, a time pattern of the second target signal, a frequency pattern of the second target signal, identities of the second set of passive radios.

In some example embodiments, the second apparatus further comprises: means for means for comparing a corresponding one of the at least one signal strength for the at least one first reference signal or the at least one signal strength for the at least one second reference signal with a corresponding one of the differential signal strengths associated with the plurality of first target signals or the differential signal strengths associated with the plurality of second target signals; and means for selecting, a line of sight for the first apparatus and the third apparatus based on a comparison result.

In some example embodiments, the second apparatus further comprises: means for determining a position of the first apparatus based on the measurements and the positions of the passive radios.

In some example embodiments, the first apparatus comprises a terminal device, the second apparatus comprises a location management device, and the third apparatus comprises a network device.

In some example embodiments, a third apparatus capable of performing any of the method 500 (for example, the third device 130 in FIG. 1) may comprise means for performing the respective operations of the method 500. The means may be implemented in any suitable form. For example, the means may be implemented in a circuitry or software module. The second apparatus may be implemented as or included in the third device 130 in FIG. 1

In some example embodiments, means for receiving, from a second apparatus, second configuration information of a second set of passive radios for transmitting a plurality of second target signals in response to receiving a plurality of second reference signals from a first apparatus; means for upon transmitting at least one first reference signal, receiving at least one second reference signal from the first apparatus; means for upon receiving the at least one second reference signal, receiving, based on the second configuration information, the plurality of second target signals from the second set of passive radios; and means for transmitting, to the second apparatus, measurements related to the at least one second reference signal and the plurality of second target signals for positioning the first apparatus.

In some example embodiments, the second configuration information comprises at least one of the following: a second mapping of a second target signal to a second reference signal, a second time window for listening the plurality of second target signals.

In some example embodiments, the second mapping indicates at least one of the following: a carrier of the second target signal, a bandwidth of the second target signal, a waveform of the second target signal, a time pattern of the second target signal, a frequency pattern of the second target signal, identities of the second set of passive radios.

In some example embodiments, the means for receiving the plurality of second target signals comprises: means for upon receiving the at least one second reference signal, determining the plurality of second target signals to be received from the second set of passive radios based on the second mapping; and means for receiving the plurality of second target signals during the second time window.

In some example embodiments, the third apparatus further comprises: means for receiving, from the second apparatus, a third measurement indication of the at least one second reference signal; and means for measuring, based on the third measurement indication, at least one receiving and transmitting time difference and at least one signal strength for the at least one second reference signal.

In some example embodiments, the third apparatus further comprises: means for receiving, from the second apparatus, a fourth measurement indication of the plurality of second target signals; and means for measuring, based on the fourth measurement indication, at least one of the following: receiving and transmitting time differences and signal strengths for the plurality of second target signals, differential receiving and transmitting time differences and differential signal strengths associated with the plurality of second target signals.

In some example embodiments, the differential receiving and transmitting time differences associated with the plurality of second target signals comprise differential receiving and transmitting time differences between time differences of the at least one second reference signal and time differences of the plurality of second target signals.

In some example embodiments, the differential signal strengths associated with the plurality of second target signals comprise differences between at least one signal strength of the at least one second reference signal and signal strengths of the plurality of second target signals.

In some example embodiments, the measurements related to the at least one second reference signal and the plurality of the second target signals comprise at least one of the following: receiving and transmitting time differences and signal strengths of a second number of the second reference signals, and receiving and transmitting time differences and signal strengths for the plurality of second target signals, or differential receiving and transmitting time differences and differential signal strengths between the plurality of second target signals and the second number of the second reference signals.

In some example embodiments, the third apparatus further comprises: means for transmitting, to a first set of passive radios, a plurality of first reference signals, the first set of passive radios caused to transmit a plurality of first target signals to the first apparatus in response to receiving the plurality of first reference signals.

In some example embodiments, the plurality of first reference signals comprises a plurality of positioning reference signals, and the plurality of second reference signals comprises a plurality of sounding reference signals.

In some example embodiments, the first apparatus comprises a terminal device, the second apparatus comprises a location management device, and the third apparatus comprises a network device.

Figure 6:
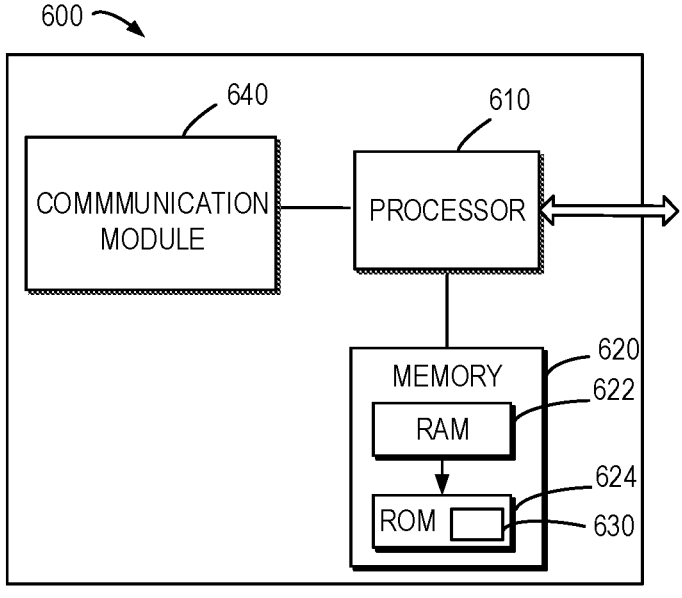
FIG. 6 illustrates a simplified block diagram of a device that is suitable for implementing example embodiments of the present disclosure.

FIG. 6 is a simplified block diagram of a device 600 that is suitable for implementing example embodiments of the present disclosure. The device 600 may be provided to implement an electronic device, for example, the first device 110, the second device 120 or the third device 130 as shown in FIG. 1. As shown, the device 600 includes one or more processors 610, one or more memories 620 coupled to the processor 610, and one or more communication modules 640 coupled to the processor 610.

The communication module 640 is for bidirectional communications. The communication module 640 has one or more communication interfaces to facilitate communication with one or more other modules or devices. The communication interfaces may represent any interface that is necessary for communication with other network elements. In some example embodiments, the communication module 640 may include at least one antenna.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The instructions of the program 630 may include instructions for performing operations/acts of some example embodiments of the present disclosure. The program 630 may be stored in the memory, e.g., the ROM 624. The processor 610 may perform any suitable actions and processing by loading the program 630 into the RAM 622.

The example embodiments of the present disclosure may be implemented by means of the program 630 so that the device 600 may perform any process of the disclosure as discussed with reference to FIG. 2 to FIG. 5. The example embodiments of the present disclosure may also be implemented by hardware or by a combination of software and hardware.

In some example embodiments, the program 630 may be tangibly contained in a computer readable medium which may be included in the device 600 (such as in the memory 620) or other storage devices that are accessible by the device 600. The device 600 may load the program 630 from the computer readable medium to the RAM 622 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 7:
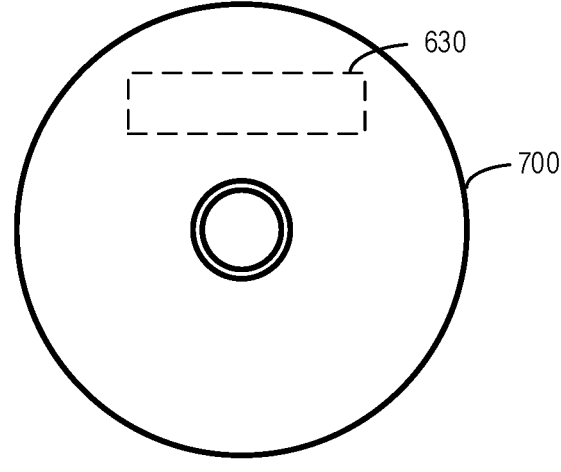
FIG. 7 illustrates a block diagram of an example computer readable medium in accordance with some example embodiments of the present disclosure.

FIG. 7 shows an example of the computer readable medium 700 which may be in form of CD, DVD or other optical storage disk. The computer readable medium 700 has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provides at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Partial Glossary

TRP Transmit Receive Point
LMF Location Management Function
IIoT Industrial Internet of Things
LoS Line of Sight
UE User Equipment
5G Fifth Generation
LTE Long Term Evolution
LTE-A LTE-Advanced
WCDMA Wideband Code Division Multiple Access
HSPA High-Speed Packet Access
NB-IoT Narrow Band Internet of Things
NR New Radio
BS Base Station
AP Access Point
eNodeB Evolved NodeB
gNB/NR NB Next Generation NodeB
RRU Remote Radio Unit
RH Radio Header
RRH Remote Radio Head
SS Subscriber Station
MS Mobile Station
AT Access Terminal
VoIP Voice over IP
PDA Personal Digital Assistant
LEE Laptop-embedded Equipment
LME Laptop-mounted Equipment
USB Universal Serial Bus
CPE Customer-Premises Equipment
HMD Head-mounted Display
MT Mobile Termination
IAB Integrated Access and Backhaul
DL Downlink
UL Uplink
Tx Transmitting
Rx Receiving
PRS Positioning Reference Signal
SRS Sounding Reference Signal
ID Identity/Identifier
IEEE Institute for Electrical and Electronics Engineers
CDMA Code Division Multiple Access
FDMA Frequency Division Multiple Access
TDMA Time Division Multiple Access
FDD Frequency Division Duplex
TDD Time Division Duplex
MIMO Multiple-Input Multiple-Output
OFDM Orthogonal Frequency Division Multiple
DFT-s-OFDM Discrete Fourier Transform spread OFDM
IoT Internet of everything
eMTC enhanced Machine-Type Communication
NR RedCap NR reduced capacity
LPP LTE Positioning Protocol
RSRP Reference Signal Receive Power
RSRQ Reference Signal Receive Quality
TD Time Difference
RTT Round-Trip Time
IE Information Element

What is claimed is:

1. A terminal device, comprising:
at least one processor; and
at least one memory storing instructions that, when executed by the at least one processor, cause the terminal device at least to perform:
receiving, from a second location management device, first configuration information of a first set of passive radios for transmitting a plurality of first target signals in response to receiving a plurality of first reference signals from a network device, wherein the first configuration information comprises a first mapping of a first target signal to a first reference signal and a first time window for listening the plurality of first target signals, wherein the first mapping indicates a carrier of the first target signal, a bandwidth of the first target signal, a waveform of the first target signal, a time pattern of the first target signal, a frequency pattern of the first target signal, and identities of the first set of passive radios, and wherein the plurality of first reference signals comprises a plurality of positioning reference signals;

receiving, from the network device, at least one first reference signal;

upon receiving the at least one first reference signal, receiving, based on the first configuration information, the plurality of first target signals from the first set of passive radios, wherein receiving the plurality of first target signals comprises:

upon receiving the at least one first reference signal, determining the plurality of first target signals to be received from the first set of passive radios based on the first mapping; and receiving the plurality of first target signals during the first time window;

transmitting, to the second location management device, measurements related to the at least one first reference signal and the plurality of first target signals for positioning the terminal device, wherein the measurements related to the at least one first reference signal and the plurality of first target signals comprise:

receiving and transmitting time differences and signal strengths of a first number of the first reference signals, and receiving and transmitting time differences and signal strengths for the plurality of first target signals, and differential receiving and transmitting time differences and differential signal strengths between the plurality of first target signals and the first number of the first reference signals;

receiving, from the location management device, a first measurement indication of the at least one first reference signal;

measuring, based on the first measurement indication, at least one receiving and transmitting time difference and at least one signal strength for the at least one first reference signal;

receiving, from the location management device, a second measurement indication of the plurality of first target signals;

measuring, based on the second measurement indication, receiving and transmitting time differences and signal strengths for the plurality of first target signals, and differential receiving and transmitting time differences and differential signal strengths associated with the plurality of first target signals, wherein the differential receiving and transmitting time differences associated with the plurality of first target signals comprise differential receiving and transmitting time differences between time differences of the at least one first reference signal and time differences of the plurality of first target signals, and wherein the differential signal strengths associated with the plurality of first target signals comprise differences between at least one signal strength of the at least one first reference signal and signal strengths of the plurality of first target signals; and transmitting, to a second set of passive radios, a plurality of second reference signals, the second set of passive radios being caused to transmit a plurality of second target signals to the network device in response to receiving the plurality of second reference signals, wherein the plurality of second reference signals comprises a plurality of sounding reference signals.

* * * * *